United States Patent [19]

Dierdorf

[11] Patent Number: 5,486,024
[45] Date of Patent: Jan. 23, 1996

[54] SOCKET FOR CONNECTING PIPE ENDS BY INJECTION OF ADHESIVE

[75] Inventor: Hans-Rolf Dierdorf, Langenfeld, Germany

[73] Assignee: Henkel Kommanditgesellschaft auf Aktion, Duesseldorf, Germany

[21] Appl. No.: 196,147

[22] PCT Filed: Aug. 13, 1992

[86] PCT No.: PCT/EP92/01847

§ 371 Date: Feb. 22, 1994

§ 102(e) Date: Feb. 22, 1994

[87] PCT Pub. No.: WO93/04311

PCT Pub. Date: Mar. 4, 1993

[30] Foreign Application Priority Data

Aug. 22, 1991 [DE] Germany .................. 41 27 775.9

[51] Int. Cl.⁶ .................................................. F16L 13/10
[52] U.S. Cl. .......................... 285/294; 285/297; 285/295
[58] Field of Search .................................. 285/294, 297, 285/21, 295, 296, 284

[56] References Cited

U.S. PATENT DOCUMENTS

| | | | |
|---|---|---|---|
| 352,754 | 11/1886 | Hurlbut | 285/294 |
| 494,147 | 3/1893 | Lloyd | 285/294 |
| 506,484 | 10/1893 | Ewing | 285/297 |
| 627,673 | 6/1899 | McDonald | 285/297 |
| 978,346 | 12/1910 | Yarrow | 285/294 |
| 3,353,563 | 11/1967 | Hutton | 285/295 |
| 3,606,401 | 9/1971 | Schwarz | 285/294 |
| 3,916,502 | 11/1975 | Bagnulo | 29/451 |
| 4,226,444 | 10/1980 | Bunyan | 285/294 |
| 4,647,080 | 3/1987 | Sandt et al. | 285/297 |
| 5,152,481 | 10/1992 | Cote et al. | 285/294 |

FOREIGN PATENT DOCUMENTS

| | | | |
|---|---|---|---|
| 1028376 | 3/1978 | Canada | 285/297 |
| 1476758 | 4/1967 | France . | |
| 3109422 | 9/1982 | Germany . | |
| 7810585 | 4/1980 | Netherlands | 285/297 |
| 0661109 | 6/1987 | Switzerland . | |
| 17760 | 5/1911 | United Kingdom | 285/297 |

*Primary Examiner*—Eric K. Nicholson
*Attorney, Agent, or Firm*—Ernest G. Szoke; Wayne C. Jaeschke; Steven J. Trzaska

[57] ABSTRACT

A socket is provided whereby pipe ends are joined together so that a gas and water-tight connection is established between the pipes. The socket is generally in the form of a tubular shell having at least one projection extending radially from an inner face of the shell. Annular elements are provided at distal ends of the shell to both center the pipes to be joined within the socket, as well as seal the annular space formed between the outer surface of the pipes and the inner surface of the socket. Annular flanges located on either side of the projection are provided to receive the ends of the pipes to be permanently joined and seal the annular spaces.

16 Claims, 3 Drawing Sheets

SOCKET FOR CONNECTING PIPE ENDS BY INJECTION OF ADHESIVE

BACKGROUND OF THE INVENTION

1. Field of the Invention

This invention relates to a socket for connecting two pipe ends by injection of adhesive into two annular spaces formed between the outer face of the pipe ends and the inner face of the socket. The tubular shell of the socket has a projection which extends radially inwards from its inner face and of which the side faces form a stop for the end faces of the pipe ends. The annular elements provided as centering and sealing rings have a face directed radially inwards to bear against the end faces of the shell and an axially extending face designed to bear against one of the faces of the shell. An annular flange is arranged on each side of the projection, surrounds the inner face of the shell and is designed for the sealing and centered insertion of the pipe ends. The shell, the rings and the annular flanges are made by injection molding.

2. Discussion of Related Art

One such socket is known from DE 31 09 422 A1. For connection, the pipe ends are pushed from opposite sides into the shell of the socket until they encounter the projection which extends around the inner face of the shell and acts as a stop and the annular elements provided as centering and sealing rings are clamped fast between the shell and the outer face of the pipe ends at the ends of the shell. Adhesive is injected through one or more injection openings into the annular space formed between the outer face of the pipe ends and the inner face of the socket, so that a gas-tight and water-tight connection is established between the pipes.

In some cases, the plastic pipes to be connected are distorted through prolonged storage and the effects of heat and are oval rather than round. In addition, the wall thicknesses and external diameters of the pipes vary. In order nevertheless to obtain an encircling annular space of sufficient thickness at each point of the circumference for safe injection bonding, the rings to be attached to the ends of the shell are provided. The annular flange extending around the inner face of the socket on each side of the projection is provided for the same purpose. In addition, the rings and the annular flanges are intended to prevent the escape of adhesive.

The socket is made of plastic by injection molding. Large numbers can only be economically produced when as few projections or recesses as possible are provided. However, the shell of the known socket with the encircling annular flange is made in one piece and the height of the projection forming the annular flange is relatively small so that problems arise during the injection molding of the shell.

SUMMARY OF THE INVENTION

Accordingly, the problem addressed by the present invention was to provide a socket of the type mentioned at the beginning which would be more suitable for production in large numbers by injection molding.

According to the invention, the solution to this problem is characterized in that the shell and the annular flanges consist of separate parts, each annular flange is a tubular centering and sealing ring bearing against the inner surface of the shell and, apart from the projection itself, the inner face of the shell has no projections or recesses in the region of the projection.

Injection molding is considerably simplified by the elimination of the relatively small step on the inner face of the shell of the socket. The necessary centering and sealing mentioned above in the region of the inner radial projection is provided by the separate centering and sealing rings replacing the annular flanges.

Not only projections and recesses of relatively small dimensions, but projections and recesses per se are obstacles to production by injection molding. In the known socket mentioned at the beginning, the annular elements to be fitted onto the ends of the shell engage in a shoulder extending around the inner face of the shell. According to the invention, therefore, the inner face of the shell has no projections or recesses except for the projection itself and any injection openings. This is because, according to the invention, the necessary centering and sealing effect can be obtained if the annular elements are fitted onto the smooth face of the shell. There is no need for any shoulders, grooves or recesses.

To make the socket easier to handle in preparation for the injection process, each annular flange has a circular part adjoining the corresponding side face of the projection. Accordingly, the separate annular flanges acting as centering and sealing rings can easily be fitted onto the pipe ends, the pipe ends are then inserted into the shell from opposite sides and, finally, the annular elements are pushed onto the ends of the shell.

The annular flanges may have an L- or U-shaped cross-section. In one particular embodiment, however, each annular flange has an L-shaped cross-section and the circular part extends radially inwards to at most the inner face of the pipe end adjoining that part. Accordingly, the annular flanges are flush with the inner face of the pipes and do not lead to any additional flow resistance and to any additional turbulence.

The annular elements to be fitted onto the ends of the shell may also have various shapes. Thus, the axially extending face of each annular element may bear against the outer or the inner face of the shell. In a preferred embodiment, however, each annular element has an L-shaped cross-section and its axially extending face bears against the outer face of the shell. Accordingly, the annular elements are easier to push on by virtue of the reduced friction. Centering of the shell of the pipe socket and sealing of the encircling annular space are obtained by virtue of the fact that the end of the circular part of the annular element bears against the outer face of the pipe end.

The shell, the annular elements and the annular flanges of the socket according to the invention may consist of different materials. One requirement, however, is that the particular material used should not dissolve during the bonding phase to such an extent that adhesive penetrates inwards; nor of course should any adhesive escape outwards. In one particularly advantageous embodiment, however, the shell, the annular elements and the annular flanges consist of the same material. More particularly, the annular elements and/or the annular flanges consist of PVC (polyvinyl chloride), more especially recycled PVC. In another advantageous embodiment, the annular elements and/or the annular flanges consist of low-density polyethylene (LDPE).

The projection serving as a stop for the pipe ends may be formed by several individual protuberances on the inner face of the shell. In one advantageous embodiment, however, the projection is an annularly encircling, uninterrupted flange.

BRIEF DESCRIPTION OF THE DRAWINGS

Embodiments of the invention are described in detail in the following with reference to the accompanying drawings, wherein.

DESCRIPTION OF THE PREFERRED EMBODIMENTS

Figure 1:
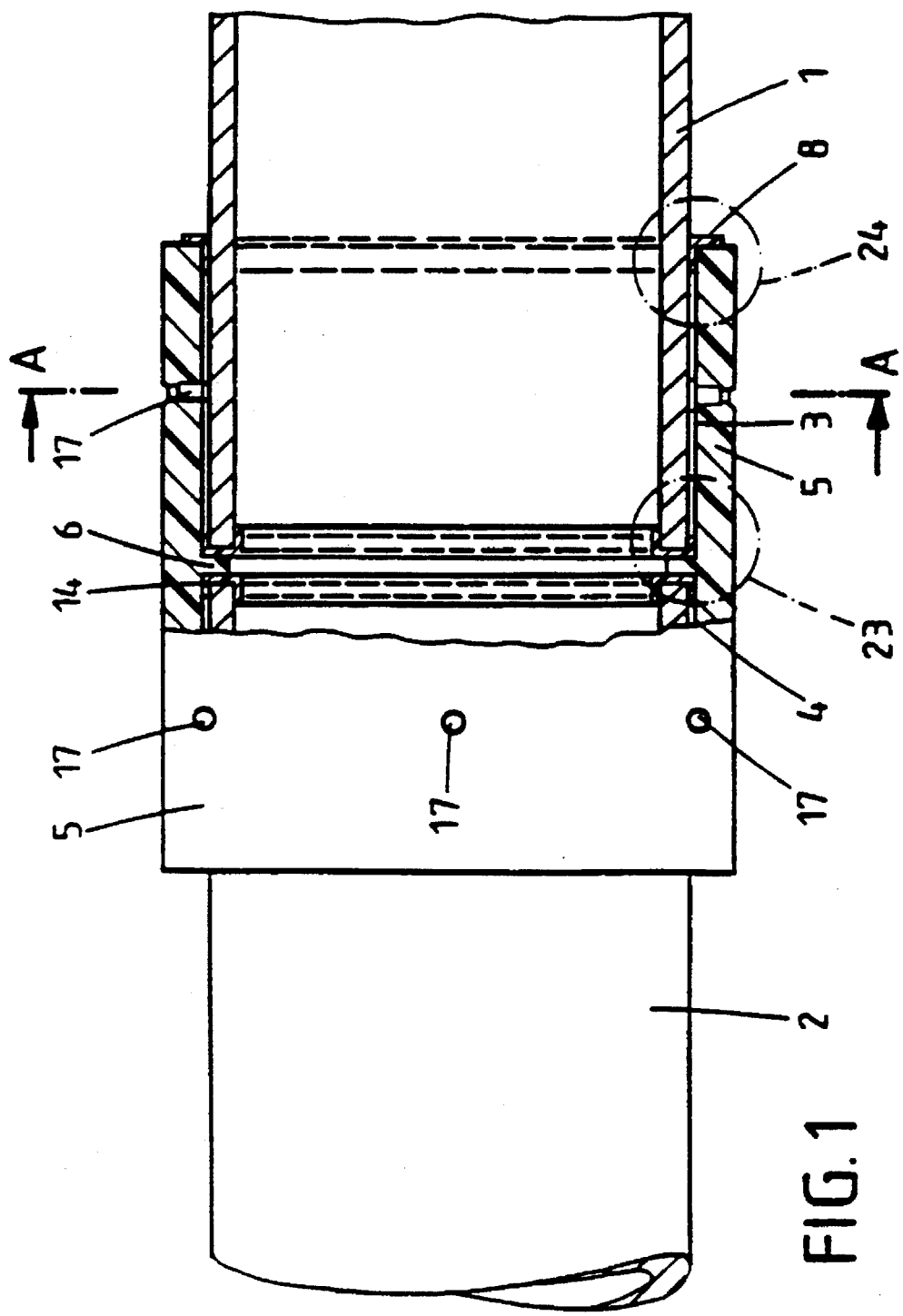
FIG. 1 is a longitudinal cross-sectional view section through a pipe connection using the socket according to the invention and an elevation thereof.
Figure 2:
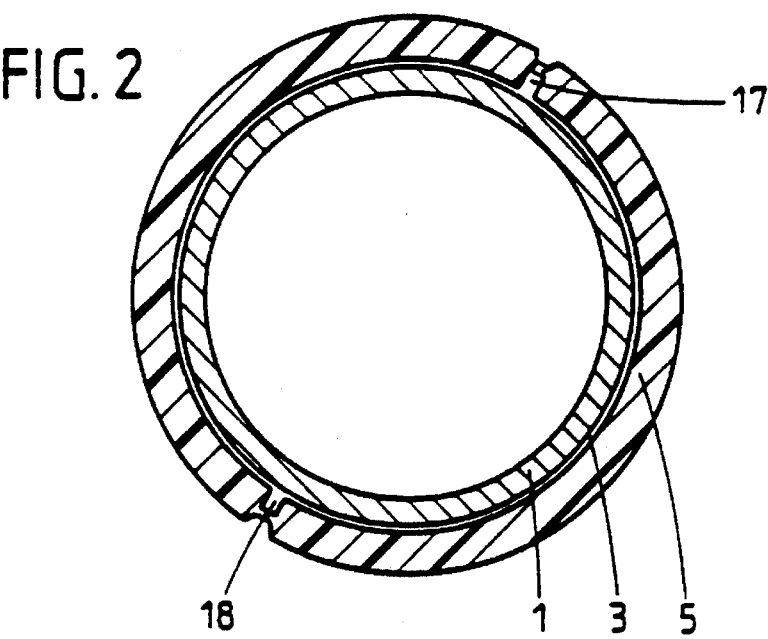
FIG. 2 is a cross sectional view along line A—A in FIG. 1.
Figure 3:
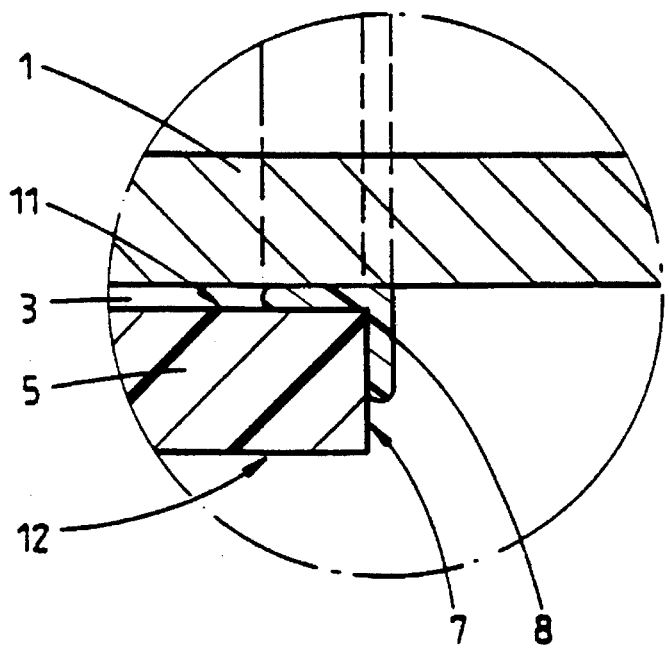
FIG. 3 shows the detail 24 in FIG. 1.
Figure 4:
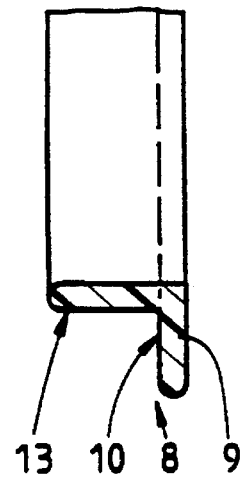
FIG. 4 shows the annular element 8 in FIG. 3 on its own.

FIG. 1 shows the connection of two pipe ends 1 and 2 using one embodiment of the socket according to the invention before the injection of adhesive. The shell 5 of the socket is pushed over the pipe ends 1 and 2. As shown in FIGS. 1 and 2 in particular, two annular spaces 3 and 4 (annular space 4 not being shown in FIG. 2) are formed by the interior face of the cylindrical shell 5 and the outer face of the pipe ends 1 and 2. At the ends of the shell 5, the annular spaces 3 and 4 are delimited by sealing elements in the form of annular elements 8 and, in the middle of the shell 5, by separate annular flanges 14 and 15. The function of the annular flanges and the annular elements is to seal the annular space and to center the shell 5 on the pipe ends 1 and 2. The axial position of the pipe ends 1 and 2 inside the shell 5 is predetermined by the flange-like projection 6 extending around the inside of the shell.

After the pipe ends have been pushed into the shell 5 as far as the projection 6 together with the annular flanges 14 and 15 acting as sealing and centering rings and after the annular elements 8 at the ends of the shell 5 have been firmly clamped between the shell 5 and the pipe ends, adhesive is injected through the injection openings 17. Several such openings may be provided, as shown in FIG. 1. Alternatively, only two such openings 17,18 may be provided, as shown in FIG. 2. The second opening 18, the outlet opening, is provided for monitoring the flow of adhesive in the annular gap. After the adhesive has set, the pipe ends 1 and 2 are connected in gas-tight and water-tight manner.

FIGS. 3 to 6 show the details 23 and 24 from FIG. 1. The annular elements which are L-shaped in cross-section in FIG. 3 lie with their hollow cylindrical part between the inner face 11 of the shell 5 and the outer face of the pipe end 1 and thus delimit the annular space 3 between those two faces. The other part of the annular element 8, the circular part, bears with its inner face 10 against the end face 7 of the shell 5. It guarantees a simple and yet exact fit of the annular element 8 between the shell 5 and the pipe end 1.

Figure 5:
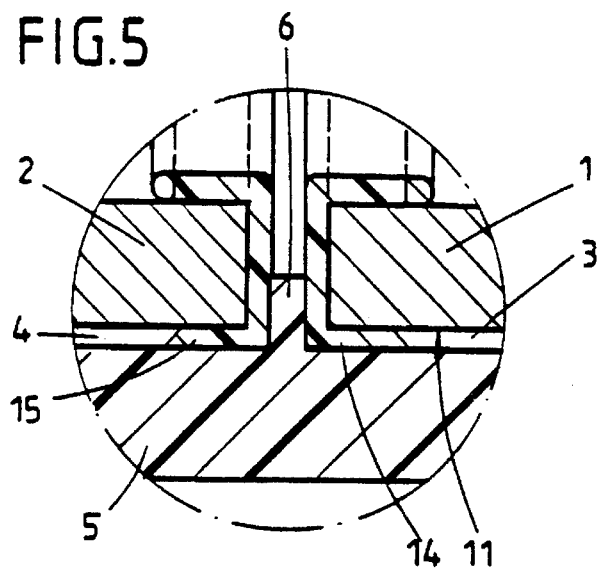
FIG. 5 shows the detail 23 in FIG. 1.
Figure 6:
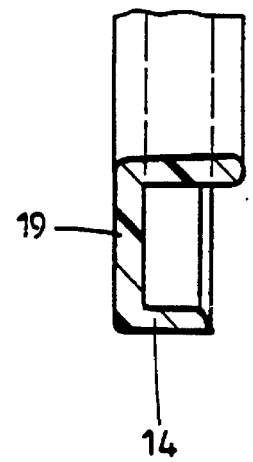
FIG. 6 shows the annular flange 14 in FIG. 5 on its own.

As shown in FIG. 5, the annular flanges formed on the inner face of the shell 5 in the known socket mentioned at the beginning are replaced in accordance with the invention by sealing and centering rings. These separate annular flanges 14 and 15 are parts of U-shaped rings which are pushed over the end faces of the pipe ends 1 and 2.

Figure 7:
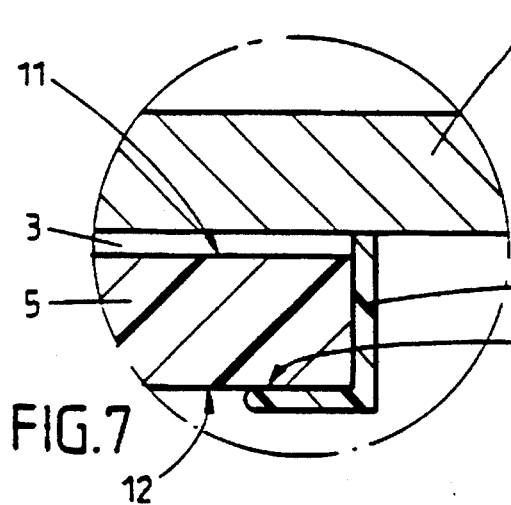
FIG. 7 shows the detail 24 in FIG. 1 in another embodiment.
Figure 8:
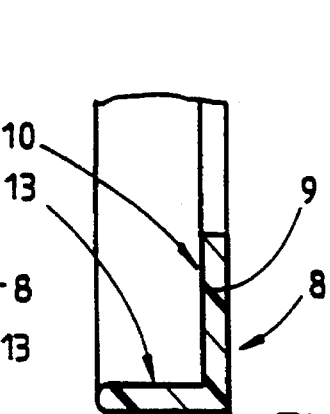
FIG. 8 shows the annular element 8 in FIG. 7 on its own.
Figure 9:
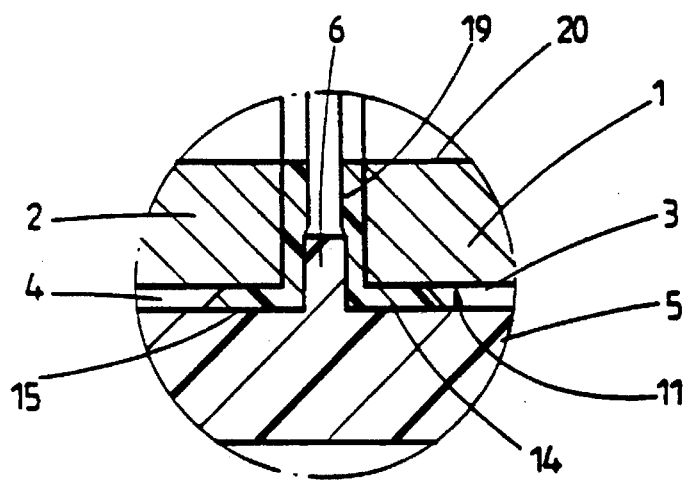
FIG. 9 shows the detail 23 of FIG. 1 in another embodiment.

Even more advantageous embodiments of sealing and centering rings than those shown in FIGS. 3 to 6 are illustrated in FIGS. 7 to 9. The annular elements provided at the ends of the shell 5 are again L-shaped. With its face 13 facing the shell 5, the hollow cylindrical part of the annular element 8 does not bear against the therefor—interior—face 11, but instead against the therefore—exterior—face 12 of the shell. The other part of the L, namely the circular part 9 of the annular element 8, is firmly positioned at its end on the outer face of the pipe end 1. In this way the shell 5 is centered and the annular space 3 is sealed. By virtue of the lower frictional resistance, the annular element 8 shown in FIG. 7 can be pushed on more easily than that shown in FIG. 3.

The sealing and centering rings serving as annular flanges 14 and 15 shown in FIG. 9 are also improved in relation to those shown in FIG. 5. In their case, the circular part 19 no longer projects into the interior of the pipes, but instead is flush with the therefore—end—face 20 of the pipe ends 1 and 2. There is no longer any reduction in the cross-section of the pipe.

However, the invention is by no means limited to the embodiments illustrated which are merely intended to serve as examples.

I claim:

1. A socket for connecting pipe ends comprising, in combination:
    (a) a tubular shell having opposing openings for receiving pipe ends to be joined, said tubular shell having an exterior face, an interior face and two end faces;
    (b) abutment means integrally connected within said tubular shell for axially positioning said pipe ends within said tubular shell, said abutment means extending radially from said interior face of said tubular shell;
    (c) annular elements mounted onto said opposing openings of said tubular shell for both centering said pipe ends within said socket and creating an annular space, sealed at one end, between said interior face of said tubular shell and an outer surface of said pipe ends;
    (d) annular flanges, separate from said tubular shell, for removable mounting onto said pipe ends and for centering said pipe ends within said socket and sealing said annular space formed between said interior face of said tubular shell and said outer surface of said pipe ends; and
    (e) at least one adhesive opening in said tubular shell of said socket for introducing an adhesive into said annular space and thereby joining said pipe ends inserted within said socket.

2. A socket according to claim 1 wherein said abutment means is comprised of at least two oppositely disposed projections.

3. A socket according to claim 1 wherein said abutment means is comprised of an annular projection extending uninterruptedly around said interior face of said tubular shell.

4. A socket according to claim 1 wherein said annular elements are L-shaped in cross-section.

5. A socket according to claim 4 wherein each of said annular elements is comprised of a circular base and an exterior projection extending therefrom to define a pair of walls connected at right angles to one another, with one wall of said pair of walls bearing against both said interior face of said tubular shell and said outer surface of said pipe ends, and the other wall of said pair of walls bearing against the end face of said tubular shell.

6. A socket according to claim 4 wherein each of said annular elements is comprised of a circular base and an exterior projection extending therefrom to define a pair of walls connected at right angles to one another with one wall of said pair of walls bearing against both said outer surface of said pipe ends and an end face of said tubular shell, and the other wall of said pair of walls bearing against said exterior face of said tubular shell.

7. A socket according to claim 1 wherein said annular flanges are U-shaped in cross-section.

8. A socket according to claim 7 wherein said annular flanges further comprise inner and outer projections connected to a circular base with said inner projection bearing against said inner surface of said pipe ends, said outer projection bearing against said outer surface of said pipe ends, and said circular base being flush with said end surface of said pipe ends.

9. A socket according to claim 1 wherein said annular flanges are L-shaped in cross-section.

10. A socket according to claim 9 wherein said annular flanges consist of an exterior projection extending from a circular base, said exterior projection bearing against an outer surface of said pipe end and said circular base extending radially inwards to at most an interior edge of said end surface of said pipe ends.

11. A socket according to claim 1 wherein said socket, annular elements, and annular flanges are made of a polymeric material.

12. A socket according to claim 1 further comprising a plurality of adhesive openings.

13. A socket according to claim 11 wherein said polymeric material consists of polyvinyl chloride.

14. A socket according to claim 13 wherein said polyvinyl chloride is recycled.

15. A socket according to claim 11 wherein said polymeric material consists of low-density polyethylene.

16. A socket according to claim 1 wherein said interior face of said tubular shell has no projections or recesses except for any said adhesive openings and said abutment means.

* * * * *

UNITED STATES PATENT AND TRADEMARK OFFICE
CERTIFICATE OF CORRECTION

PATENT NO. : 5,486,024
DATED : Jan. 23, 1996
INVENTOR(S) : Hans-Rolf Dierdorf

It is certified that error appears in the above-identified patent and that said Letters Patent is hereby corrected as shown below:

In col 4, line 6, after "the" delete "therefore--interior--" and insert --interior--.
In col 4, line 7, after "the" delete "therefore--exterior--" and insert --exterior--.
In col 4, line 19, after "the" delete "therefore--end--" and insert --end--.

Signed and Sealed this

Sixth Day of January, 1998

Attest:

BRUCE LEHMAN

Attesting Officer

Commissioner of Patents and Trademarks